United States Patent [19]

Mani et al.

[11] Patent Number: 5,228,962
[45] Date of Patent: Jul. 20, 1993

[54] SEPARATION/RECOVERY OF AMMONIUM SALTS VIA ELECTRODIALYTIC WATER SPLITTING

[75] Inventors: Krishnamurthy N. Mani, Basking Ridge; Frederick P. Chlanda, Rockaway; Yu-Chih Chiao, Bridgewater, all of N.J.

[73] Assignee: Allied-Signal Inc., Morristownship, Morris County, N.J.

[21] Appl. No.: 649,776

[22] Filed: Feb. 1, 1991

[51] Int. Cl.$^5$ .............................................. C25B 1/16
[52] U.S. Cl. .............................. 204/182.4; 204/182.5; 204/93; 204/102
[58] Field of Search ............... 204/182.4, 182.5, 93, 204/102

[56] References Cited

U.S. PATENT DOCUMENTS

| | | | |
|---|---|---|---|
| 2,829,095 | 8/1956 | Oda et al. | 204/98 |
| 4,116,889 | 9/1978 | Chlanda et al. | 521/27 |
| 4,219,396 | 8/1980 | Gancy et al. | 204/180 |
| 4,552,635 | 11/1985 | Jenczewski et al. | 204/182.4 |
| 4,738,764 | 4/1988 | Chlanda et al. | 204/296 |
| 4,740,281 | 4/1988 | Chlanda et al. | 204/151 |
| 4,806,219 | 2/1989 | Yamamoto et al. | 204/182.4 |
| 5,006,211 | 4/1991 | Paleologou et al. | 204/182.4 |

FOREIGN PATENT DOCUMENTS

| | | |
|---|---|---|
| 134118 | 3/1985 | European Pat. Off. . |
| 319260 | 6/1989 | European Pat. Off. . |
| 2727409 | 1/1979 | Fed. Rep. of Germany . |
| 2008395 | 1/1970 | France . |
| 9006168 | 6/1990 | World Int. Prop. O. . |

Primary Examiner—T. Tung
Assistant Examiner—Arun S. Phasge
Attorney, Agent, or Firm—Karen A. Harding; Jay P. Friedenson; Darryl L. Webster

[57] ABSTRACT

The present invention is an improved process for electrodialytically generating salts of volatile acids and/or bases from a salt stream. The salt of the volatile base may either be generated from a similar salt, or may be recovered from a mixed salt solution containing the salt of a volatile base and other similar salts. The salt solution is treated in a two or three compartment electrodialytic water splitter. The acid formed in the acid compartment of the electrodialytic unit is neutralized as it is formed by adding the volatile base directly to the acid loop. Neutralization of the acid in the acid loop minimizes the acid concentration in the electrodialytic unit, thereby increasing the efficiency of the membranes, and the cell stack. The electrodialytic unit may be run in either batch or continuous mode.

15 Claims, 4 Drawing Sheets 5,228,962

SEPARATION/RECOVERY OF AMMONIUM SALTS VIA ELECTRODIALYTIC WATER SPLITTING

BACKGROUND OF THE INVENTION

The present invention relates to the generation of the salt of a volatile base from a salt solution via treatment in an electrodialytic water splitter. The present invention has particular use in the generation and/or recovery of ammonium salts like ammonium sulfate at improved purity and concentration.

The use of water splitting to produce acid and base from salts is well known. Purification of acids and bases from solutions containing the acid or base is also known. However, processes which can be used to generate or isolate a desired salt at high concentration and purity have not been previously disclosed.

For example, in the production of zeolite catalyst supports, a solution of ammonium sulfate is used to ion exchange the zeolite from the sodium to the ammonium form. The zeolite process requires large quantities of concentrated, pure ammonium sulfate, and creates a large quantity of sodium sulfate/ammonium sulfate waste solution. A convenient sulfate salt, such as $Na_2SO_4$ (or the mixed sulfate salt waste generated by the zeolite process) could be processed in a conventional electrodialytic water splitter to produce sulfuric acid and sodium hydroxide. The sulfuric acid could then be reacted with ammonia to produce ammonium sulfate. However, the electrodialytic production of acids, especially at high concentration, is particularly difficult, gives low current efficiency, and requires the use of high resistance membranes, which greatly increases the energy consumption of the electrodialytic unit.

Further the direct disposal of many industrial waste salts is environmentally objectionable. For example, in the zeolite process, large quantities of sodium/ammonium sulfate waste are generated, and are becoming increasingly more difficult to discard directly. Ammonium salts are particularly objectionable because they are nutrients which promote the growth of algea. Presently, the ammonium sulfate is recovered by adding caustic to the sodium/ammonium sulfate waste salt stream to free the ammonia, which is collected in an absorber. Sulfuric acid is added to the absorber, regenerating the ammonium sulfate. The remaining sodium sulfate generated is thrown away. Thus, even after recycling the volatile base a substantial quantity of salt is still discarded. Further, the caustic and sulfuric acid used are expensive, and add significantly to production costs.

Accordingly, an object of the present invention is to provide an improved electrodialytic process which can efficiently generate the salt of a volatile base, like ammonium sulfate, at high concentration and purity, from a related salt. A further object of the present invention is to provide a process which is capable of separating and concentrating the salt of a volatile base from a solution containing other related salts.

Three compartment electrodialytic water splitters are known in the art. They are disclosed to be comprised of alternating bipolar, anion and cation permselective membranes, thereby forming alternating acid, salt and base compartments. U.S. Pat. No. 2,829,095 discloses three compartment electrodialytic water splitters generally. U.S. Pat. No. 4,740,281 discloses the recovery of acids from materials comprising acid and salt using an electrodialytic three compartment water splitter to regenerate the acid from the salt.

Two compartment water splitters are also known in the art. U.S. application Ser. No. 278,062 discloses a two compartment electrodialytic unit for separating acid from a solution containing acid and salt.

Modified two compartment water splitters having an intermediate compartment which decreases unwanted migration of ions other than $H^+$ and $OH^-$ are also known. Such water splitters are generally disclosed in U.S. application Ser. No. 626,643 (filed Dec. 12, 1990).

Chlanda, *Water Splitting Efficiency of Bipolar Membranes*, New Membrane Materials and Process for Separation, K. K. Sirkar and D. R. Lloyd, Eds, AICHE Symposia vol. 261, pgs. 64–71 (1988), discloses metering a base into the acid compartment of a three compartment water splitter as a means to measure the current efficiency of the cell.

As previously stated, use of any of the electrodialytic units to produce a concentrated salt require unsatisfactorily low current efficiency, and high power consumption. The concentration and purity of the salt generated by conventional methods is also unacceptably low. Accordingly, it is the primary objective of the present invention to provide an economical and efficient electrodialytic process capable of producing a salt, and particularly, the salt of a volatile base at high concentration and purity.

SUMMARY OF THE INVENTION

The present invention is an improved process for electrodialytically generating salts of volatile acids and/or bases from a salt stream. The salt of the volatile base may either be generated from a similar salt, or may be recovered from a mixed salt solution containing the salt of a volatile base and other similar salts. The salt solution is treated in one of the electrodialytic units disclosed herein. The acid formed in the acid compartment of the electrodialytic unit is neutralized as it is formed by adding the volatile base directly to the acid loop. Neutralization of the acid minimizes the acid concentration in the electrodialytic unit, thereby increasing the efficiency of the membranes, and the cell stack. The electrodialytic unit may be run in either batch or continuous mode.

The volatile base may either be provided from an external source, or recovered from a mixed salt solution. In applications where the volatile base is to be recovered, the salt solution containing the volatile base is fed into the feed compartment of the electrodialytic unit. The volatile base remains in the depleted salt stream and may be recovered via air vacuum or steam stripping, and then cycled to the acid loop.

DETAILED DESCRIPTION OF THE INVENTION

Salts of volatile bases may be isolated from mixed salts by using the two step process of the present invention. The acid component of the salt is separated via an electrodialytic water splitter. Either a two or three compartment electrodialytic water splitter, or an electrodialytic unit having an intermediate acid compartment may be used. Each configuration will be discussed individually below. The volatile base, which may be recovered from the salt solution, or provided from an external source, is added to the acid product loop to produce the desired salt of a volatile base.

By continuously neutralizing the acid in the acid product compartment, a salt solution with a concentration of about 20% or greater can be generated at high current efficiency, and low power consumption. On the other hand, if a strong acid such as sulfuric or hydrochloric acid is produced and removed from the water splitter, generally, the highest concentration economically achievable is on the order of about 10%. Thus, the process of the present invention is capable of generating salt solutions which are at least twice as concentrated as those which can be generated by making an acid in the electrodialytic unit, and neutralizing the acid outside the acid loop.

Typically, the volatile base component is ammonia. However other volatile bases such as methylamine may also be recovered via the present invention. Univalent anions, such as $Cl^-$, $F^-$, and $NO_3^-$, divalent anions such as $SO_4^{2-}$, and trivalent anions such as $PO_4^{3-}$ are the most common acid components. Usually, the mixed salt solution will contain two salts with the same anionic component, but different cationic components. Typical salt combinations are $Na_2SO_4/(NH_4)_2SO_4$, $NaNO_3/NH_4NO_3$, $Na_2HPO_4/(NH_4)_2HPO_4$, and $NaF/NH_4F$. This list is exemplary and not enumerative, and other combinations should be obvious to one skilled in the art. A single salt such as sodium sulfate may be used to generate the salt of the volatile base, ammonium sulfate. If a single salt, without a volatile component is used, the volatile base will have to be provided from an external source, and added to the acid loop as make-up. The term "salt solution" is used thoughout this application to mean a solution containing at least one salt, with or without a volatile component.

To minimize membrane fouling cationic impurities like $Mg^{2+}$ and $Ca^{2+}$ may be removed via ion exchange. The mixed salt solution may be filtered prior to introduction into the water splitter to removed multivalent metal hydroxides, dissolved organics, and suspended solids which are likely to cause fouling of the anion membranes.

Once the impurities have been removed, the salt solution is treated in one of the following electrodialytic water splitters. In each instance the term "acid product stream" is used to describe the salt that is generated by combining the generated acid with fresh or recovered volatile base.

Figure 1:
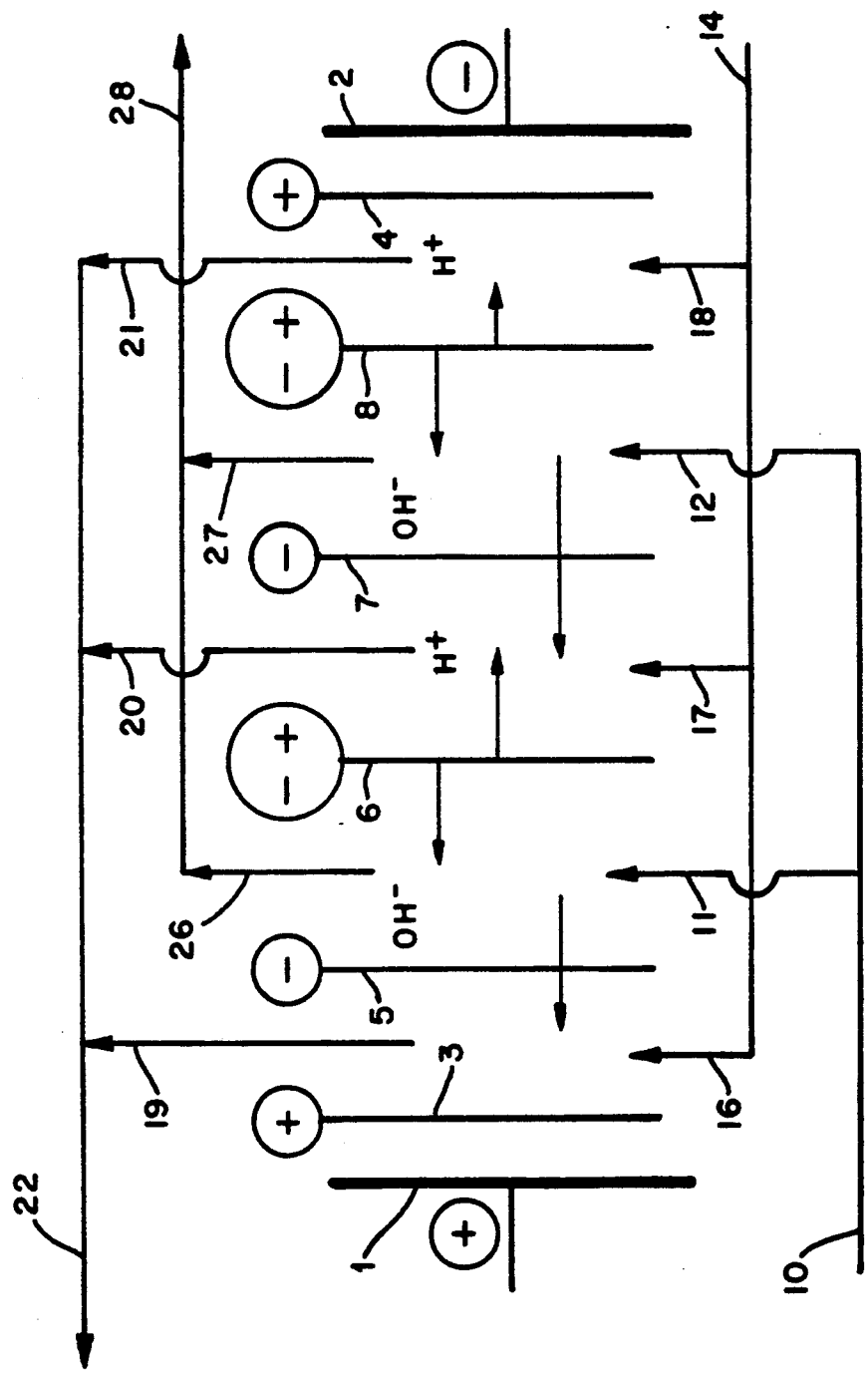
FIG. 1 is a schematic drawing of a two compartment water splitter.

A single cell of a two compartment water splitter is shown in FIG. 1. The water splitter is made up of alternating salt feed and acid product compartments which are formed by alternating anion and bipolar membranes arranged between an anode and a cathode. Anode, 1, and a cathode, 2, are separated from the cell via cation membranes, 3 and 4, respectively. A unit cell is formed by first bipolar membrane, 6, anion membrane, 7, and second bipolar membrane, 8. Preferably, an electrodialytic water splitter is made up of several repeating unit cells, and most preferably, between 50-150 repeating cells. If more cells were added onto the single unit cell shown in FIG. 1, the second bipolar membrane, 8, would also be the first bipolar membrane of the second cell.

Each bipolar membrane has an anion layer and a cation layer, and is oriented so that the anion layer faces the anode, and the cation layer faces the cathode. While the invention discloses a bipolar membrane to split water it should be understood by one skilled in the art that any configuration which is capable of splitting water under the influence of a direct current, such as spaced apart cation and anion exchange membranes may be used.

Suitable anion membranes for use in the above described water splitter are designated AMP, ASV or AMV made by Asahi Glass, Ionics 204-UZL-386 or RAI 4035 membranes. Examples of useful bipolar membranes are disclosed in U.S. Pat. No. 4,116,889, and made by Allied-Signal Inc. Examples of suitable cation membranes are disclosed in U.S. Pat. No. 4,738,764 and made by Allied-Signal, Inc., CMV cation membranes, which are commercially available from Asahi Glass, or Nafion membranes which are commercially available from Dupont.

The filtered salt solution is fed to the water splitter via line 10, and into the feed compartments (bounded by anion membrane, 5, and bipolar membrane, 6; and anion membrane, 7, and bipolar membrane, 8) via inlet lines 11 and 12 respectively. An aqueous solution is fed via inlet lines 17, 16, and 18, to the respective acid product compartments (located between the cation layer of bipolar membrane, 6, and anion membrane, 7; cation membrane, 3, and anion membrane, 5; and the cation layer of bipolar membrane, 8, and cation membrane, 4,). Preferably the aqueous solution is either water, a dilute acid solution, or a portion of the neutralized or basic salt.

A direct current is passed between the electrodes causing the anions to migrate toward the anode and the cations to migrate toward the cathode. Thus, anions migrate from the salt feed compartments into the acid product compartments and combine with the hydrogen ions which are introduced by the cation layer of the bipolar membrane.

The crux of the present invention lies in feeding a volatile base to directly to the acid loop via line 14. In so doing, the acid formed in the acid compartment is neutralized, forming the acid product, and the efficiency of the cell is correspondingly increased.

The resulting acid product is withdrawn from the product compartments by lines 19, 20 and 21 and passes from the unit via line 22. The acid depleted salt solution is withdrawn from the water splitter via lines 26, and 27, and passed from the unit via line 28.

Figure 2:
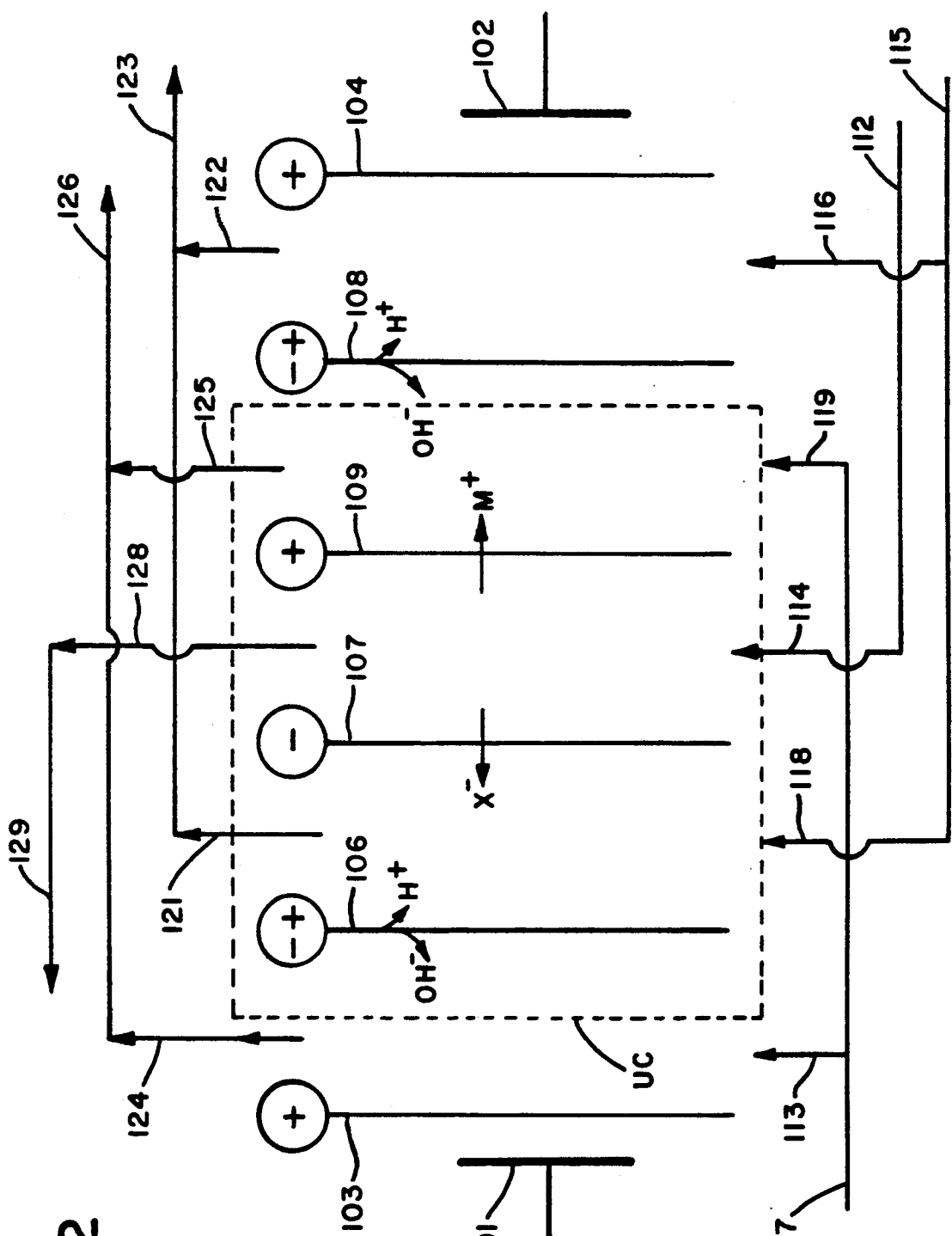
FIG. 2 is a schematic drawing of a three compartment water splitter.

A three compartment electrodialytic water splitter may also be used for the first step of the present invention. FIG. 2 shows a three compartment electrodialytic water splitter having a single cell, UC. The anode, 101, and the cathode, 102, are separated from the cell by cation membranes, 103, and 104. The single cell shown has an acid product compartment, a salt feed compartment, and a base compartment formed by bipolar membrane, 106, anion membrane 107, and cation membrane, 109. Bipolar membrane, 108, is the first membrane of the next or adjacent cell.

Each bipolar membrane has an anion and a cation layer, and is oriented so that each anion layer faces the anode, 101, and the cation layer faces the cathode, 102. While the invention discloses a bipolar membrane to split water it should be understood by one skilled in the art that any configuration which is capable of splitting water under the influence of a direct current, such as spaced apart cation and anion exhange membranes, may be used.

The membranes are arranged so that there is an acid product compartment between the cation layer of bipolar membrane, 106, and anion membrane, 107; a salt feed compartment between anion membrane 107, and cation membrane 109; and a base compartment between cation membrane, 109, and the anion layer of bipolar membrane, 108. A solution containing mixed salts is fed to the unit via inlet line 112, and to the salt compartment via line 114. A first aqueous solution is fed to the unit via inlet line 115, and to the acid product compartments via lines 116 and 118. A second aqueous solution is fed to the unit via inlet line 117, and to the base compartments via lines 113 and 119. The first aqueous solution is preferably water, a dilute acid solution or a solution of the desired salt product. The second aqueous solution is preferably water or a dilute base solution.

A direct current is passed between the electrodes causing the anions to migrate toward the anode and the cation to migrate toward the cathode. Thus, anions in the salt feed compartment migrate across anion membrane 107, and into the acid product compartment. Acid is formed when the migrating anions combine with hydrogen ions which are generated by bipolar membrane, 106. Similarly, cations in the salt compartment migrate across cation membrane, 109, into the base compartment, and form base with the hydroxide ions generated by bipolar membrane, 108. Acid is also formed in the compartment between the cation layer of bipolar membrane, 108, and cation membrane, 104.

As described in regard to FIG. 1, volatile base is added directly to the acid loop via a feed line (not shown) which is in communication with inlet line 115. Thus, the acid generated is controllingly neutralized, allowing for greater product concentration at high current efficiency.

The resulting acid product is removed from the acid compartments via lines 121 and 122, and removed from the unit via line 123. The resulting base is removed from the base compartment via line 125, and withdrawn from the electrodialytic unit via line 126. The depleted salt is withdrawn from the salt feed compartment via 128, and removed from the unit via line 129.

The base recovered from the three compartment water splitter may be used to adjust the pH of the salt solution and free the volatile base component, or may be recycled through the base compartment to increase the concentration to a level suitable for sale.

Figure 3:
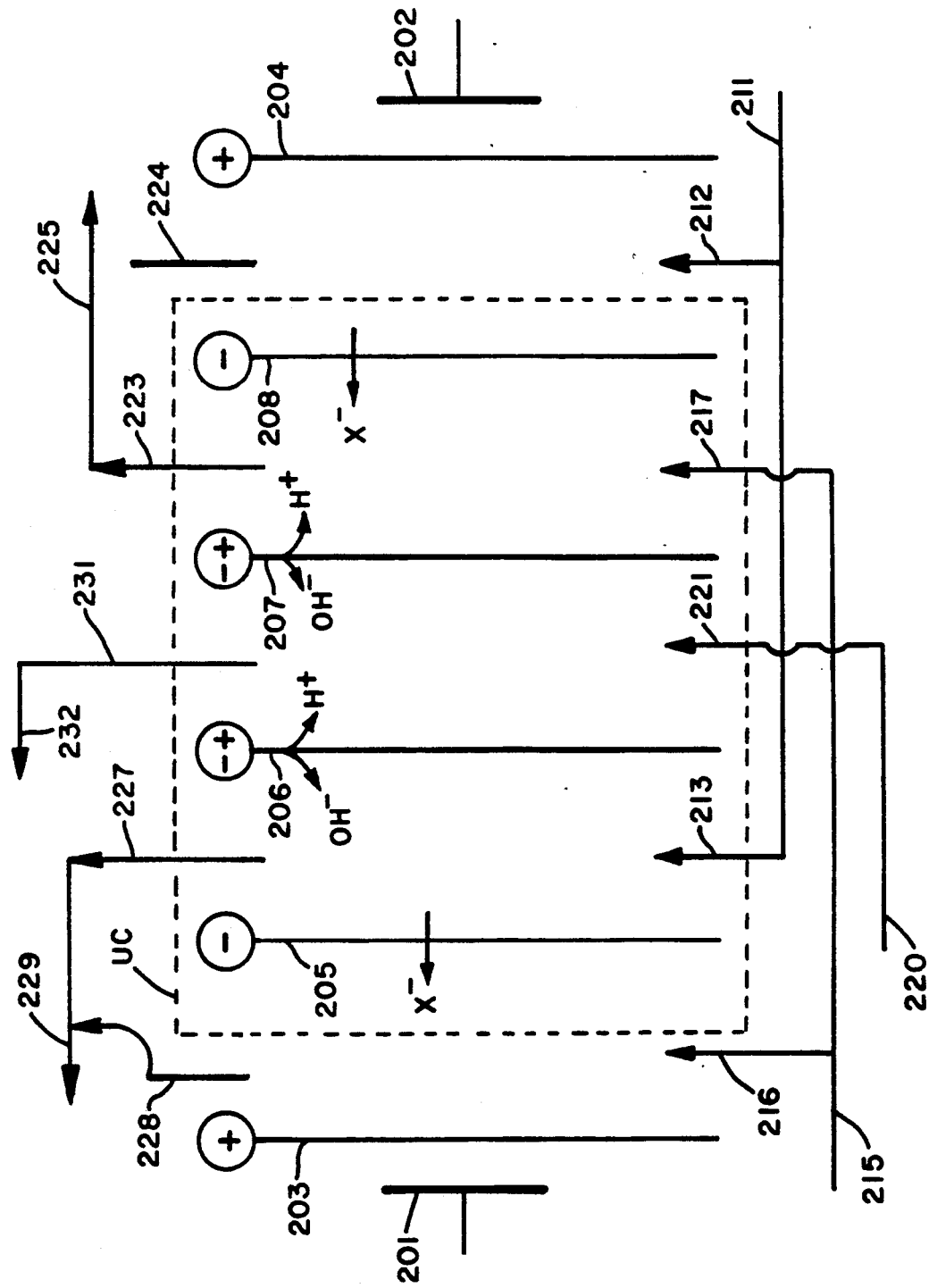
FIG. 3 is a schematic drawing of a two compartment water splitter of FIG. 1, which has been modified to increase the purity of the resulting acid.

Alternatively, if a higher purity salt of a volatile base is required, the electrodialytic unit of FIG. 3 may be used to recover the acid component. The modified two compartment electrodialytic unit of FIG. 3 is made up of alternating salt feed, acid product and intermediate acid compartments. The anode, 201, and the cathode, 202, are separated from the cell by cation membranes 203, and 204. The unit cell, UC, is formed by anion membrane, 205, bipolar membrane, 206, second bipolar membrane, 207, and second anion membrane, 208. Each bipolar membrane has a cation and an anion layer, and is arranged so that the anion layer faces the anode, 101.

There is an acid product compartment located between anion membrane 208, and the cation layer of second bipolar membrane, 207; an intermediate acid compartment located between second bipolar membrane, 207, and first bipolar membrane, 206; and a salt feed compartment located between first bipolar membrane, 206, and anion membrane, 205.

The intermediate acid compartment functions as an impurity capture zone. Theoretically ions other than $H^+$ and $OH^-$ should not be able to migrate across a bipolar membrane. However, because the membranes are not perfectly permselective, some ions do migrate across the bipolar membranes. But, by placing two bipolar membranes in series, cations from the salt feed compartment which might otherwise migrate across the bipolar membrane, and into the acid product compartment are trapped in the intermediate acid compartment. Thus, the presence of unwanted cations in the acid product compartment may be minimized, and the purity of the resulting acid product increased.

The salt solution is supplied to the electrodialytic unit via line 211, and fed to the salt feed compartments via lines 212, and 213. An aqueous solution is supplied to the unit via line 215, and is fed to the acid product compartments via lines 216, and 217. Preferably the aqueous solution is either water or a dilute solution of the desired acid product. A second aqueous solution is fed to the unit via line 220, and fed to the intermediate acid product compartment via line 221. The second aqueous solution is preferably a dilute solution of the acid or the desired acid product.

A direct current is passed between the electrodes causing the anions to migrate toward the anode. Thus, anions migrate across anion membranes, 205 and 208, into the acid product compartments and combine with the hydrogen ions which are introduced by the cation layer of the bipolar membrane, 207 (and the bipolar membrane of the previous cell, not shown). Any cations which may migrate across bipolar membrane 206, will combine with the hydroxyl ions generated by bipolar membrane, 207, and thus be trapped in the intermediate base compartment. Further, the solutions generated in the intermediate base compartment are continuously withdrawn so that no appreciable concentration of product may accrue.

Volatile base is added to the acid loop via inlet line 215, neutralizing the acid generated in the water splitter.

The resulting acid product is withdrawn from the acid compartments via lines 223 and lines 224, and is passed from the unit via line 225. The depleted salt is withdrawn from the salt feed compartments via lines 227, and 228, and is passed from the unit via line 229. The base generated in the intermediate acid compartment is withdrawn via line 231, and is passed from the unit via line 232.

While the acid product is being recovered from the mixed salt solution in one of the foregoing electrodialytic units, the volatile base component may also be recovered from the depleted salt solution. The volatile base component may be recovered via steam, vacuum or air stripping and added to the acid product loop. Alternatively, volatile base component from an exterior source may be added directly to the acid product loop.

Figure 4:
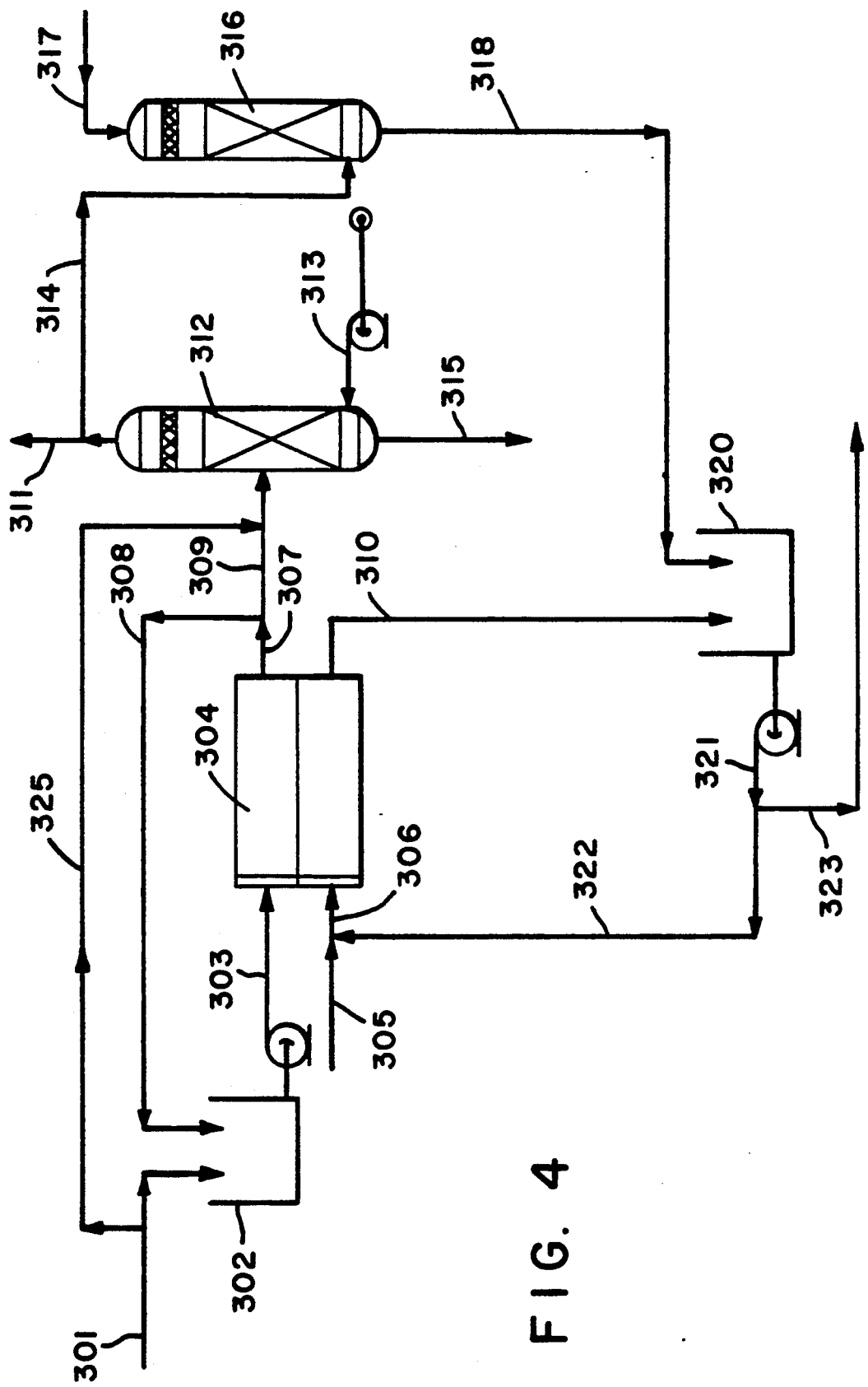
FIG. 4 is a flow diagram for the process of the present invention.

FIG. 4 shows an embodiment of the entire process. For application where the feed salt solution contains the desired volatile salt, the feed stream may be pH adjusted to facilitate stripping of the volatile base. For applications where the feed salt does not contain the salt of the volatile base, or where stripping would be inefficient, pH adjustment is not necessary.

Thus, the mixed salt stream is fed into pH adjustment tank, 302, via line 301. The pH is approximately adjusted to the $pk_b$ of the volatile base (approximately a pH of 11 for ammonia) to free the volatile base component. The pH adjusted salt solution is fed into the salt compartment of electrodialytic water splitter, 304, via line 303. Alternatively, the clean mixed salt solution can be dirctly fed to the salt loop via line 303, and its pH adjusted to or above the $pk_b$ of the volatile base. The electrodialytic water splitter shown in FIG. 4 has two compartments. Either the three compartment water splitter of FIG. 2, or the modified two compartment water splitter of FIG. 3 may be used. An aqueous solution, preferably water, or a solution of the desired salt is fed, via line 305, into the acid compartment of the electrodialytic water splitter, 304. A direct current is applied across the water splitter and acid is collected in the acid compartment, leaving an anion depleted but further basified salt stream in the salt feed compartment. Given a feed solution containing sodium and ammonium sulfate, the following reactions would take place in the water splitter. In the feed compartment, ammonium ions react with the hydroxide ions generated by the bipolar membrane to form ammonium hydroxide. Sulfate ions migrate into the adjacent acid compartment, where they combine with hydrogen ions to form sulfuric acid. Ammonia is added to the acid loop via line 305 to neutralized the sulfuric acid as it is formed, generating ammonium sulfate.

The acid product is removed from the water splitter in either continuous or batch mode, and transported to holding tank 320, via line 310. If the three compartment water splitter of FIG. 2 were to be used, the base generated could be recycled back through the water splitter to increase the concentration of the base, used to pH adjust the salt feed stream, or be withdrawn and used outside of the process. The depleted salt stream is removed from the water splitter via line 307, and may either be recycled to the pH adjustment tank via line 308, or fed in whole or part to the air stripper, 312, via line 309. Air is fed into the air stripper via line 313. The volatile base component is stripped from the mixed salts, and recovered via line 311. The recovered volatile base may be added to the salt loop of the electrodialytic water splitter via line 305 (the intercommunication between lines 311 and 305 is not shown). The remaining salt is removed from the air stripper via line 315, and discarded, or returned to the salt loop of the electrodialytic unit for further processing.

A portion of the volatile base component is introduced into absorber, 316, via line 314 and combined with a portion of the recovered acid or the acid product transported via line 323 and supplied to the absorber via line 317. Volatile base is neutralized in the absorber, and recovered via line 318. The recovered acid product and the neutralized volatile base are introduced into mixing tank, 320, via lines 318, and 310 respectively. The desired salt of a volatile base is thereby recovered, and may be recycled to the front end of the industrial process or stored in a holding tank via line 323. Alternatively, a portion of the recovered salt may be recycled via line 322, and used as the feed for the acid compartment of electrodialytic water splitter, 306.

For uses which require salt of high purity and concentration, the salt may be concentrated via crystallization and centrifuging (not shown). The small amount of alkali metal impurity may be removed as $Na_2SO_4(NH_4)_2SO_4 \cdot 4H_2O$. This salt may be recycled to the salt loop or discarded.

Alternatively, the mixed salt stream may be divided prior to being fed into the electrodialytic water splitter. Part of the mixed salt stream is removed from line 301, and routed directly to the air stripper feed line, 309, via line 325. By treating only a portion of the salt stream, pretreatment costs and/or membrane life may be extended.

In cases where relatively small quantities of volatile salt are sought to be recovered, or where it proves difficult to strip the volatile component, the volatile component may be provided from an external source and added directly to the salt loop via line 305.

In a preferred embodiment the mixed salt stream is pretreated so that its sodium sulfate concentration is at least 3%. This can be done by subjecting the salt stream to reverse osmosis, electrodialysis, or by spiking the stream with concentrated sodium sulfate.

Further the waste stream may be pretreated to remove metal impurities. NaOH may be added to increase the pH of the mixed salt solution, or Duolite may be added to precipitate out the metal impurities.

Additional modifications of the process will be apparent to those skilled in the art within the scope of the essence of the invention set forth herein.

The invention is further illustrated by reference to the following examples, the details of which should not be construed as limiting the invention except as may be required by the appended claims.

EXAMPLE 1

35 grams of $Na_2SO_4$ was added to 2100 ml of a waste stream containing $Na_2SO_4$, $(NH_4)_2SO_4$, $NH_3$, and other impurities to raise the total percentage of Na in the solution to 0.99%. The spiked sample was used as the feed to a two compartment electrodialytic water splitter as shown in FIG. 1. Aquatech Systems bipolar and anion membranes with surface areas of 23 $cm^2$ each were used to form a four cell stack. Nafion cation membranes were used to separate the electrodes from the cells. The process of FIG. 4 was used.

The waste solution was processed batch wise. 2000 ml of a waste solution containing 0.008M $NH_3$, 0.22M $(NH_4)_2SO_4$, 0.215M $Na_2SO_4$ and minor impurities was fed into the salt feed compartment of the water splitter via line 303. 400 ml of 1.15M $(NH_4)_2SO_4$ was fed into the acid compartment via line 305. The cell was operated at 1.25 A (50 ASF) for 386 minutes. $NH_3$ was forced out of the base compartment by a stream of compressed air and re-absorbed in the solution being fed to the acid compartment. The pH in the salt/base loop was monitored, and the process was stopped when the pH reached 11.92. The final feed solution was 1760 ml 0.22M $Na_2SO_4$, and the final pH in the acid compartment was 1.13.

EXAMPLE 2

In this experiment concentrated $NH_4OH$ was added to the acid compartment in order to maintain the pH at 4. $NH_3$ was not stripped from the salt/base compartment.

The two compartment water splitter of example 1 was used for this example. 2100 ml of a waste salt solution containing $Na_2SO_4$, $(NH_4)_2SO_4$, and other impurities was spiked with 35 gm of $Na_2SO_4$. The salt solution was treated with Duolite ES467 to remove some of the metal impurities.

The solutions were processed batchwise. 2000 ml of a waste salt solution containing 0.2175M $(NH_4)_2SO_4$, 0.217M $Na_2SO_4$, 0.007M $NH_3$, 2 ppm La, 8.6 ppm Si, 11 ppm Ca, 2.4 ppm Mg, 0.2 ppm B, 0.1 ppm Mn was fed into the salt/base compartments. 400 ml of 1.235M $(NH_4)_2SO_4$ was fed into the acid compartments. 1 L of 0.5M $Na_2SO_4$ and a little NaOH was used in the electrode rinse loop. The cell was operated at 1.25 A (a current density of 50 amps/ft$^2$) for 336 minutes. The final concentration of solution in the acid comparatment was 1.55M (for 586 ml of acid), and the final concentration of the solution in the base compartment was 0.22M $Na_2SO_4$/0.0025M $(NH_4)_2SO_4$, which represents a 99% conversion to $(NH_4)_2SO_4$. The current efficiency for base production was 82%, and the current efficiency for acid production was 79.3%.

EXAMPLE 3

In this example the three compartment water splitter of FIG. 2 was used to split $Na_2SO_4$ into NaOH and $H_2SO_4$, and $NH_4OH$ was added directly into the acid loop.

The test stack had four unit cells, each having one bipolar, one cation and one anion membrane. Aquatech bipolar membranes, AMP anion membranes, and Nafion cation membranes were used. The active area of each membrane was 23 cm$^2$. The acid and base loops were operated in a batch mode, and the salt loop was operated in a feed and bleed mode. The acid and base loops were heated to 45° C. to improve the current efficiency.

The salt solution was filtered through #41 Whatman paper to remove the insoluble solids. The salt solution was pH adjusted to 12 with the addition of 25 ml of 50% NaOH and 16.4 gm of $Na_2CO_3$ to precipitate out Mg and Ca. The precipitates were removed by filtration with a 1.2 micron filter. The solution was passed through an activated carbon (Norit RO 0.8 pellets) column at 2 BV/hr to remove organic foulants. The resulting solution was then passed through an ion exchange column (Duolite 467) at 1BV/hr and room temperature to remove the residual calcium. The final solution (15.64% $Na_2SO_4$) had 0.09 ppm Ca and 0.02 ppm Mg.

The salt loop was operated in a feed and bleed mode, in which 15.64% $Na_2SO_4$ was metered in at a constant rate so that salt overflow was 4.98% $Na_2SO_4$ (K=56.8 mS/cm). The acid loop was initially charged with 400 ml of 3.3M $(NH_4)_2SO_4$, and maintained at pH 5 by addition of 18% $NH_3$ (or 37% $NH_4OH$) during the experiment. The base loop was batched from 0.51M to 4.45M.

The cell was operated at 100 ASF for 362 minutes. The final acid product was 761 ml of 2.80M $(NH_4)_2SO_4$. The salt overflow was slightly basic (0.25M OH) because of hydroxide leakage across the cation membrane. The current efficiency for acid and base production was 77% and 75% respectively. The final ammonium sulfate product contained 0.0717M $Na_2SO_4$ (3300 ug/ml Na) and the final sodium hydroxide product had 0.0385M $Na_2SO_4$ (3700 ug/ml sulfate).

We claim:

1. An improved method for producing a concentrated salt from a dilute salt solution comprising a first salt having a cationic component which is different than the cationic component of said product salt in an electrodialytic water splitter having at least one bipolar membrane bordering an acid compartment in which acid is electrodialytically produced,
   comprising the step of; feeding a volatile base having the same cationic component as said product salt into a stream which circulates through said acid compartment, generating a concentrated salt solution in said acid compartment.

2. The method of claim 1 wherein said electordialytic water splitter further comprises: a two compartment water splitter having at least one anion and at least two bipolar membranes.

3. The method of claim 1 wherein said electrodialytic water splitter is a three compartment water splitter having sequentially alternating bipolar, anion and cation membranes.

4. The method of claim 1 wherein said electrodialytic water splitter is a three compartment water splitter having two adjacent bipolar membranes, which bound an intermediate acid compartment therebetween, and at least one anion membrane.

5. The method of claim 1 wherein said dilute salt solution further comprises a salt of the volatile base.

6. The method of claim 1 wherein said concentrated salt has a concentration equal to or in excess of 1M.

7. The method of claim 1 wherein said concentrated salt has a concentration equal to or in excess of 2M.

8. The method of claim 5 wherein said first salt is a sulfate salt, and said volatile base is ammonia.

9. The method of claim 1 wherein said concentrated salt solution is substantially free of acid.

10. A method for producing a salt of a volatile base from a salt feed solution comprising at least two salts, each having a different cation in an electrodialytic water splitter having at least one bipolar membrane bordering an acid compartment in which acid is electrodialytically generated, wherein the improvement comprises feeding a volatile base to said acid compartment to form said salt of a volatile base.

11. The method of claim 10 wherein said salt feed solution comprises at least two sulfate salts, and said volatile base is ammonia.

12. The method of claim 10 wherein said salt is substantially free of acid.

13. A method for separating a concentrated salt from a mixed salt solution comprising:
   providing an electrodialytic water splitter having an anode and a cathode, at least one anion membrane disposed between and spaced apart from at least two bipolar membranes to form two compartments therebetween, each bipolar membrane having a cation layer and an anion layer, arranged so that said anion layers of said bipolar membrane face said anode, wherein a first compartment is a salt feed compartment between an anion layer of said second bipolar membrane and said anion membrane, and where the other compartment is an acid product compartment between said anion membrane and said cation layer of said first bipolar membrane;
   feeding said mixed salt solution to said salt feed compartment;
   feeding an aqueous solution to said acid product compartment;
   applying sufficient potential across said water splitter to cause the migration of anions across said anion membrane and into said acid product compartment, splitting of water into $H^+$ and $OH^-$ at the bipolar membranes, forming acid in said acid product compartment and the corresponding anion depletion of the salt solution;

recovering a volatile base from said depleted salt solution;

feeding said volatile base to a stream which circulates through said acid product compartment to form a salt product; and removing said salt product from said acid product compartment.

14. The method of claim 13 wherein said volatile base from said depleted salt solution is recovered by at least one method chosen from the group consisting of: steam, vacuum, air stripping.

15. The method of claim 13 wherein said salt stream contains ammonium sulfate and at least one other sulfate salt, and said volatile base is ammonia.

* * * * *